United States Patent
An et al.

(10) Patent No.: US 10,168,823 B2
(45) Date of Patent: Jan. 1, 2019

(54) DATA DRIVER CIRCUIT AND DISPLAY DEVICE USING THE SAME

(71) Applicant: SAMSUNG DISPLAY CO., LTD., Yongin-si, Gyeonggi-do (KR)

(72) Inventors: Bo Young An, Hwaseong-si (KR); Ho Suk Maeng, Seoul (KR); Weon Jun Choe, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/885,923

(22) Filed: Oct. 16, 2015

(65) Prior Publication Data

US 2016/0209977 A1  Jul. 21, 2016

(30) Foreign Application Priority Data

Jan. 15, 2015  (KR) .......... 10-2015-0007623

(51) Int. Cl.
*G06F 3/041*  (2006.01)
*G09G 3/36*  (2006.01)

(52) U.S. Cl.
CPC .......... *G06F 3/0416* (2013.01); *G06F 3/0412* (2013.01); *G09G 3/3611* (2013.01); *G09G 2310/0283* (2013.01)

(58) Field of Classification Search
CPC ................ G06F 3/0412; G06F 3/0416; G09G 2310/0264
See application file for complete search history.

(56) References Cited

U.S. PATENT DOCUMENTS

| 6,600,492 B1* | 7/2003 | Shimomura ............ G06T 1/60 345/501 |
| 9,384,523 B1* | 7/2016 | Penner .................... G06F 9/48 |
| 2009/0019448 A1* | 1/2009 | Bouge .................. G06F 9/5016 718/104 |
| 2010/0277505 A1 | 11/2010 | Ludden et al. |
| 2014/0143692 A1* | 5/2014 | Wigdor ................ G06F 3/0488 715/764 |
| 2014/0143712 A1 | 5/2014 | Nahm |

FOREIGN PATENT DOCUMENTS

| KR | 10-2013-0122789 A | 11/2013 |
| KR | 10-2014-0126263 A | 10/2014 |

* cited by examiner

*Primary Examiner* — Chun-Nan Lin
(74) *Attorney, Agent, or Firm* — Innovation Counsel LLP (57) ABSTRACT

A data driving circuit according to an exemplary embodiment includes a controller configured to generate a storing control signal which controls a memory storing direction and a read control signal which controls a memory reading direction, the memory storing direction and the memory reading direction determined according to a rotation signal; a memory in which a sensing signal corresponding to a touch state of one or more touch sensors is configured to be stored in accordance with the storing control signal; and a rendering unit configured to read the sensing signal according to the memory reading direction of the read control signal and to combine a first image data signal with the sensing signal so as to generate a second image data signal.

8 Claims, 11 Drawing Sheets

DATA DRIVER CIRCUIT AND DISPLAY DEVICE USING THE SAME

CROSS-REFERENCE TO RELATED APPLICATION

This application claims priority to, and the benefit of, Korean Patent Application No. 10-2015-0007623 filed in the Korean Intellectual Property Office on Jan. 15, 2015, the entire contents of which are incorporated herein by reference.

BACKGROUND (a) Field

Embodiments of the present invention relate generally to flat panel displays. More specifically, embodiments of the invention relate to a data driver circuit and a display device using the same.

(b) DESCRIPTION OF SYMBOLS

A display device such as a liquid crystal display (LCD), an organic light emitting diode display (OLED display), and an electrophoretic display includes a field generating electrode and an electro-optical active layer. For example, the organic light emitting diode device includes an organic emission layer as the electro-optical active layer. The field generating electrode may be connected to a switching element such as a thin film transistor that receives a data signal, and the electro-optical active layer converts the data signal into an optical signal to display an image.

Such a display device may include a touch sensing function which enables touch interaction with a user, in addition to the function of displaying an image. By the touch sensing function, when a user writes a letter or draws a picture on a screen by approaching or contacting the screen with a touch point or using a touch pen, the display device detects a change on the screen, such as a pressure, a charge, or light to detect contact information such as whether an object approaches or is in contact with the screen or a contact position. The display device may receive the image signal and display an image based on the contact information.

Such a touch sensing function may be implemented using touch sensors. Touch sensors may be classified in various was including as a resistive type, a capacitive type, an electro-magnetic type (EM), and an optical sensing type (optical type) touch sensor.

Touches which are detected by touch-sensitive display modules are processed by high level application software which typically operates on a mobile application processor (AP). Due to what is typically a large number of processing steps taken by the display module and the AP, as well as a non-deterministic processing time (including delays due to other computing jobs performed by the AP) for the AP, a high level latency which reduces responsiveness of a computing device with respect to the touch input of the user is introduced. Therefore, a low latency visual accelerator (LLVA) technique has been suggested, which has an advantage in which a part of the touching function is reflected on the display module without passing through a touch processor, so that a response time of the touch is shortened. Particularly, mobile devices such as smart phones or tablets often feature the ability to rotate their displayed image according to the device's orientation.

However, when the LLVA is used, such rotation information is not accounted for in touch detection, which is implemented in a different driver IC. Thus, rotation of the image is not accounted for when determining a touch coordinate. Therefore, an incorrect image is displayed and thus a touch error of the user may be incurred.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a data driving circuit and a display device using the same, and more particularly, provide a data driver using an LLVA technique and a display device using the same.

Embodiments of the present invention overcome the above-mentioned problems and incorporate image rotation into the touch information so as to suppress touch error due to image rotation.

Technical objects of the present invention are not limited to the above-mentioned technical objects and other technical objects which have not been mentioned above may be clearly understood by those skilled in the art from the description of the present invention.

A data driving circuit according to an exemplary embodiment includes a controller configured to generate a storing control signal which controls a memory storing direction and a read control signal which controls a memory reading direction, the memory storing direction and the memory reading direction determined according to a rotation signal; a memory in which a sensing signal corresponding to a touch state of one or more touch sensors is configured to be stored in accordance with the storing control signal; and a rendering unit configured to read the sensing signal according to the memory reading direction of the read control signal and to combine a first image data signal with the sensing signal so as to generate a second data signal.

Further, the storing control signal of the data driving circuit according to the exemplary embodiment may include first through fourth storing control signals, the read control signal may include a first read control signal, the controller may be further configured to direct storage of the sensing signal in the memory in accordance with the first through fourth storing control signals, and the rendering unit may be further configured to read the sensing signal in accordance with the first read control signal.

Further, the first through fourth storing control signals may comprise data corresponding to 0°, 90°, 180°, and 270°, respectively, and the first read control signal comprises data corresponding to 0°.

The storing control signal may include a first storing control signal, the read control signal may include first through fourth read control signals, the controller may be further configured to direct storage of the sensing signal in the memory in accordance with the first storing control signal, and the rendering unit may be further configured to read the sensing signal in accordance with the first through fourth read control signals.

The first storing control signal may comprise data corresponding to 0°, and the first through fourth read control signals may comprise data corresponding to 0°, 90°, 180°, and 270°, respectively.

In a display device including a data driving circuit according to another exemplary embodiment, the data driving circuit may include: a controller configured to generate a storing control signal which controls a memory storing direction and a read control signal which controls a memory reading direction, the memory storing direction and the memory reading direction determined according to a rotation signal; a memory in which a sensing signal corresponding to a touch state of one or more touch sensors is configured to be stored in accordance with the storing control signal; and a rendering unit configured to read the sensing signal according to the memory reading direction of the read control signal so as to generate a data signal corresponding to the image data.

The storing control signal may include first through fourth storing control signals, the read control signal may include a first read control signal, the controller may be further configured to direct storage of the sensing signal in the memory in accordance with the first through fourth storing control signals, and the rendering unit may be further configured to read the sensing signal in accordance with the first read control signal.

Further, the first through fourth storing control signals may comprise data corresponding to 0°, 90°, 180°, and 270°, respectively, and the first read control signal comprises data corresponding to 0°.

The storing control signal may include a first storing control signal, the read control signal may include first through fourth read control signals, the controller may be further configured to direct storage of the sensing signal in the memory in accordance with the first storing control signal, and the rendering unit may be further configured to read the sensing signal in accordance with the first through fourth read control signals.

The first storing control signal may comprise data corresponding to 0°, and the first through fourth read control signals comprise data corresponding to 0°, 90°, 180°, and 270°, respectively.

The data driving circuit according to an exemplary embodiment of the present invention and the display device using the same incorporate image rotation into the touch information so as to suppress touch error.

DETAILED DESCRIPTION OF THE EMBODIMENTS

Hereinafter, an exemplary embodiment disclosed in the specification will be described in detail with reference to the drawings. Same or like reference numerals designate same or like elements throughout the specification and redundant description will be omitted. Suffixes of constituent elements used in the following description, such as "module" and "unit" are given or mixed and used only by considering easiness in preparing the specification but do not have distinctive meanings or functions in themselves. In describing the exemplary embodiment disclosed in the specification, when it is determined that the detailed description of the known art related to the exemplary embodiment disclosed in the specification may obscure the gist of the present invention, the detailed description thereof will be omitted. Further, while the exemplary embodiment of this invention has been described with reference to the accompanying drawings, it is to be understood that the technical spirit of the invention is not limited to the accompanying drawings, but, on the contrary, is intended to cover various modifications and equivalent arrangements included within the spirit and scope of the appended claims.

Terminologies including an ordinary number, such as first and second are used for describing various constituent elements, but the constituent elements are not limited by the terms. The above terminologies are used only to discriminate one constituent element component from another constituent element.

Throughout this specification and the claims that follow, when it is described that an element is "coupled" or "connected" to another element, the element may be "directly coupled or connected" to the other element or "connected" to the other element through a third element. In contrast, when it is described that an element is "directly coupled" or "directly connected" to another element, the element may be "coupled" to the other element without having a third element therebetween.

A singular form may include a plural form unless expressly specified otherwise in the context. The various Figures are not to scale. All numerical values are approximate, and may vary.

In the present invention, it should be understood that terminology such as "include" or "have" INDicates that a feature, a number, a step, an operation, a component, a part or the combination thereof described in the specification is present, but does not exclude the possibility of the presence or addition of one or more other features, numbers, steps, operations, components, parts or combinations.

Figure 1:
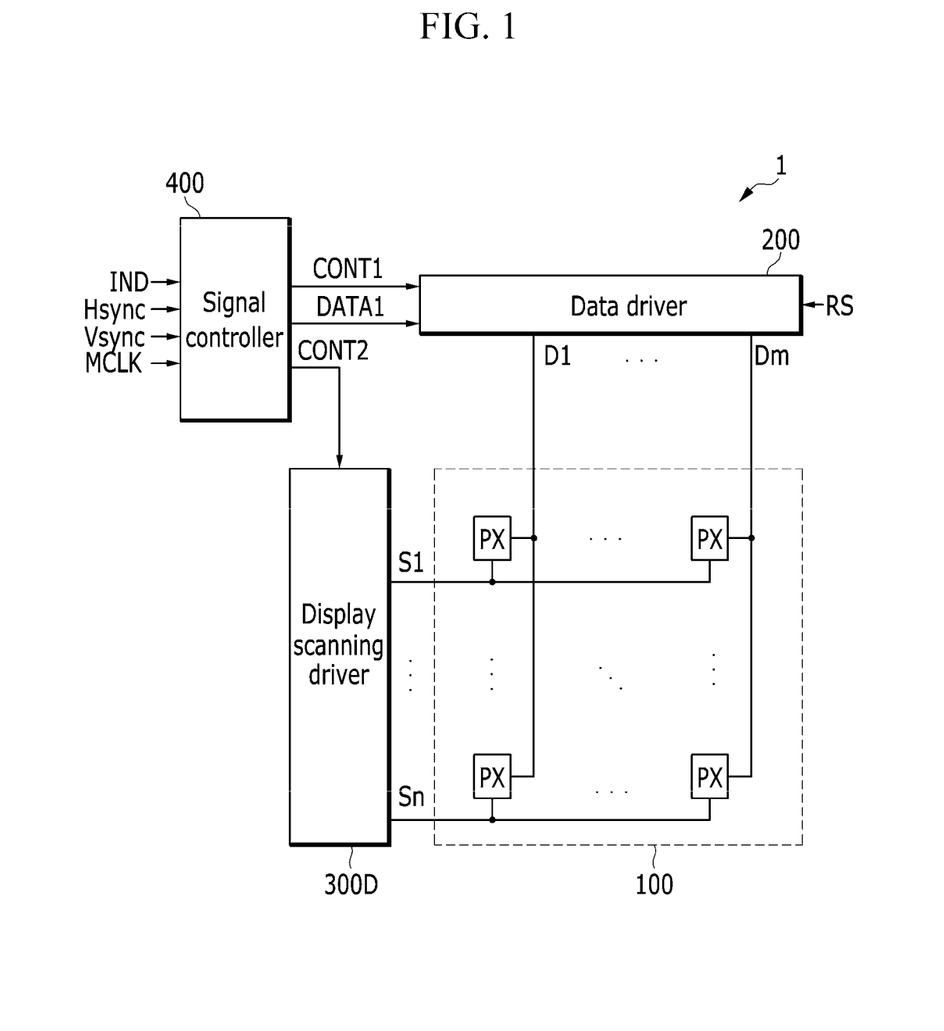
FIGS. 1 and 2 are views illustrating a configuration of a display device according to an exemplary embodiment.
Figure 2:
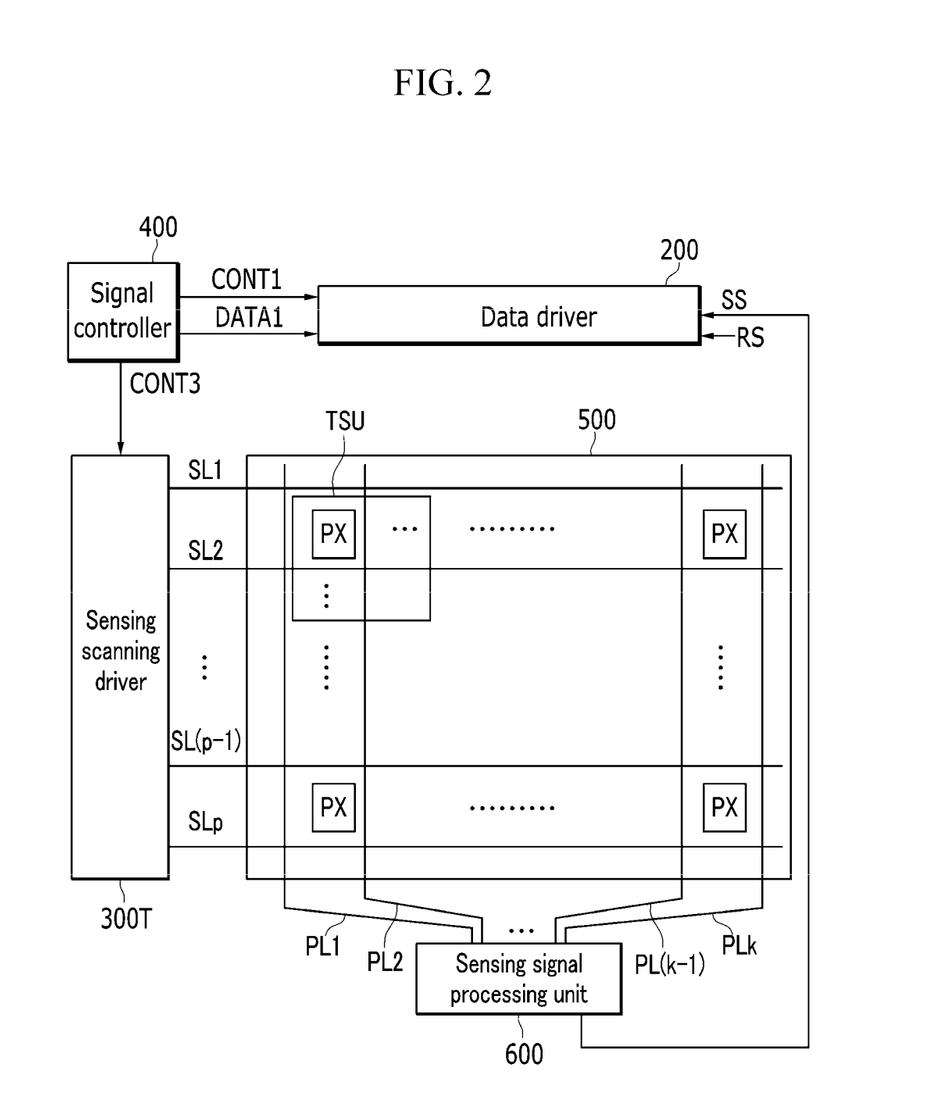

Hereinafter, the display device according to the exemplary embodiment will be described with reference to FIGS. 1 and 2. FIGS. 1 and 2 are views illustrating a configuration of a display device according to an exemplary embodiment.

As illustrated in FIGS. 1 and 2, the display device 1 includes a plurality of scanning lines S1 to Sn, a plurality of data lines D1 to Dm, a plurality of sensing input signal lines SL1 to SLp, a plurality of sensing output signal lines PL1 to PLk, a display panel 100, a data driver 200, a display scanning driver 300D, a sensing scanning driver 300T, a signal controller 400, a touch panel 500, a sensing signal processing unit 600, a plurality of pixels PX, and a plurality of touch sensors (TSU).

As illustrated in FIG. 1, the plurality of scanning lines S1 to Sn extends generally in a horizontal direction. The plurality of data lines D1 to Dm extends generally in a vertical direction.

The display panel 100 includes the plurality of pixels PX which is connected to the plurality of scanning lines S1 to Sn and the plurality of data lines D1 to Dm and which is arranged substantially in a matrix configuration.

The data driver 200 is connected to the plurality of data lines D1 to Dm. The data driver 200 generates a plurality of data signals D[1] to D[m] (for example, data voltages) corresponding to an input first image data DATA1. A rotation signal RS and a sensing signal SS are input to the data driver 200. The rotation signal RS includes rotation information such as a rotation angle, a rotation direction, and a rotation angular speed for the display device 1. The data driver 200 includes a signal pin (not illustrated) and directly receives the rotation signal RS as pin information from a host (not illustrated) which may be any external source. Further, or alternatively, the data driver 200 may include a rotation register (not illustrated) to receive the rotation signal RS as a register command from the host. However, the exemplary embodiment is not limited thereto.

The data driver 200 reads first image data DATA1 in units of frames from a frame buffer 230 (see FIG. 3) based on a reading direction and a reading order that may vary based on the rotation information of the display panel 100. The data driver 200 reads the sensing signal SS from a memory 220 (see FIG. 3). The data driver 200 combines the sensing signal SS with the image data DATA1 to generate the plurality of data signals D[1] to D[m] corresponding to the first image data DATA1, which will be described in further detail below.

The display scanning driver 300D is connected to the plurality of scanning lines S1 to Sn and sequentially applies a plurality of scanning signals S[1] to S[n] to the plurality of scanning lines S1 to Sn in accordance with a scan control signal CONT2.

The signal controller 400 receives external input data IND and a synchronization signal and generates a data driving control signal CONT1, a display scan control signal CONT2, a sensing scan control signal CONT3, and a first image data DATA1. The external input data IND contains luminance information of each pixel PX and the luminance has a predetermined number of gray levels, for example, $1024=2^{10}$, $256=2^8$ or $64=2^6$ gray levels. The synchronization signal includes a horizontal synchronization signal Hsync, a vertical synchronization signal Vsync, and a main clock signal MCLK. The signal controller 400 divides the external input data IND in the unit of frame in accordance with the vertical synchronization signal Vsync. Further, the signal controller 150 divides the external input data IND by scanning line in accordance with the horizontal synchronization signal Hsync, to generate the first image data DATA1.

The pixel PX is a unit image display, and one pixel PX displays (spatial division) one of primary colors or a plurality of pixels PX alternately display (temporal division) the primary colors by time so that a desired color is displayed as a spatial or temporal sum of the primary colors. The pixel PX is synchronized with a corresponding scanning signal to receive the data signals D[1] to D[m] from the corresponding data line. The data signals D[1] to D[m] which are input to the pixel PX are written in the pixel PX in accordance with the scanning signal which is supplied through the scanning line.

As illustrated in FIG. 2, each of the plurality of sensing input signal lines SL1 to SLp (p is a natural number) extends at least approximately in a horizontal direction, and each of the plurality of sensing output signal lines PL1 to PLk (k is a natural number) extends at least approximately in a vertical direction. The plurality of touch sensors TSU of touch panel 500 is connected to the corresponding sensing input signal lines SL1 to SLp and the corresponding sensing output signal lines PL1 to PLk. The plurality of pixels PX is arranged in a matrix configuration.

The sensing input signal lines SL1 to SLp are connected to the sensing scanning driver 300T and extend to be substantially parallel to each other. The sensing input signal lines SL1 to SLp transmit the sensing input signal which is output by the sensing scanning driver 300T. The sensing input signal may have various waveforms and voltage levels.

The sensing output signal lines PL1 to PLk are connected to the sensing signal processing unit 600, intersect the sensing input signal lines SL1 to SLp, and extend to be substantially parallel to each other. The sensing output signal generated by the touch sensor TSU in response to a touch on the display panel 100 may be applied to the sensing output signal lines PL1 to PLk.

The sensing scanning driver 300T applies a sensing input signal (for example, a sensing input voltage) to the sensing input signal lines SL1 to SLp based on the sensing scan control signal CONT3. In this case, the sensing input signals may be sequentially applied.

The sensing signal processing unit 600 generates the sensing signal SS including touch information such as whether the touch sensor TSU was touched, a touch coordinate, or a touch trace based on the sensing output signal. Even though the sensing signal processing unit 600 is illustrated separately from the signal controller 400 in FIG. 2, the exemplary embodiment is not limited thereto and the sensing signal processing unit 600 may be included in the signal controller 400.

The touch sensor TSU may detect a touch from a user who uses an arbitrary type of pointing equipment, such as a part of a body of the user (for example, a finger) or a stylus. The touch sensor TSU may capacitively generate the sensing output signal in accordance with the touch. As illustrated in FIG. 2, one touch sensor TSU may be disposed at intersections of the sensing input signal lines and the sensing output signal lines. For example, one sensor TSU may be located proximate to where sensing input signal line SL2 intersects sensing output signal line PL2. A length of one side of the touch sensor TSU may be approximately several mm, for example, approximately 4 to 5 mm, although any size touch sensors TSU are contemplated. A size of the touch sensor TSU may vary, for example, depending on an area touched when an object touches the display panel 100.

Further, a plurality of pixels PX may be disposed within the area of one touch sensor TSU. For example, several tens to several hundreds of pixel PX columns may be disposed along a row direction or a column direction in the region of one touch sensor TSU. However, a density of the pixels PX corresponding to one touch sensor TSU is not limited thereto but may be vary depending on a resolution of the display device.

Each touch sensor TSU may include a sensing capacitor formed by its sensing input signal line and the sensing output signal line. The sensing capacitor may include an overlap sensing capacitor formed by an overlap of its sensing input signal line and its sensing output signal line, as well as a fringe sensing capacitor formed by parts of its sensing input signal line and sensing output signal line which do not overlap, but are adjacent to, each other. The touch sensor TSU receives the sensing input signal transmitted by its sensing input signal line SL to generate a charge used to detect a touch. Specifically, when a predetermined sensing input signal is input to the touch sensor TSU, the sensing capacitor is charged with a predetermined amount of charge, which changes if a touch occurs. The charge is output to the sensing output signal line PL as a sensing output signal. That is, when there is a touch by an external object, the quantity of charges stored in the sensing capacitor as a result of the sensing input signal is changed, and becomes the sensing output signal output to the sensing output signal line PL1. When the display panel 100 is touched by an object, a voltage level of the sensing output signal may be lower than a voltage level of the sensing output signal when the display panel 100 is not touched by an object. The magnitude of the sensing output signal thus depends on whether a touch has occurred, and can thus be used to determine the touch state of the touch sensor TSU.

Figure 3:
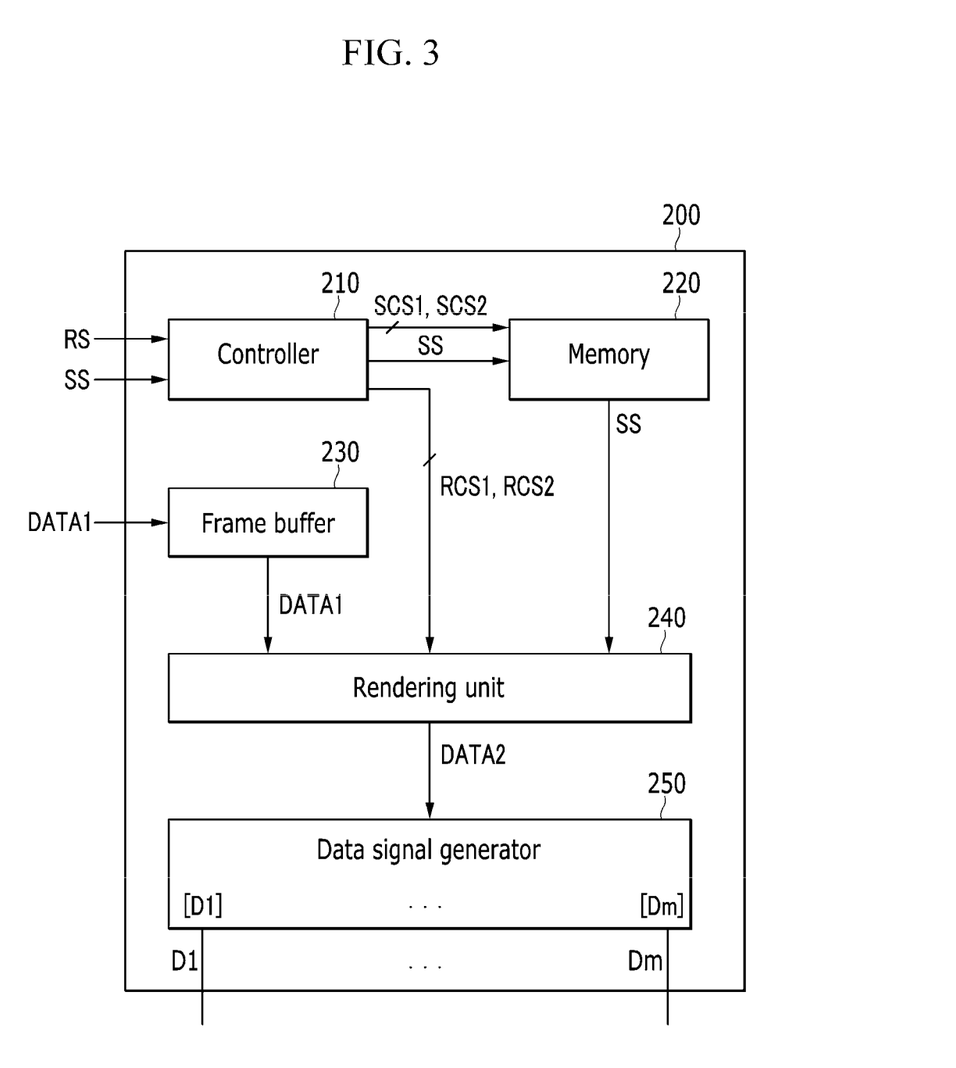
FIG. 3 is a view illustrating a configuration of a data driver according to an exemplary embodiment.

Hereinafter, the data driver according to the exemplary embodiment will be described with reference to FIG. 3. FIG. 3 is a view illustrating a data driver according to an exemplary embodiment.

As illustrated in FIG. 3, the data driver 200 includes a controller 210, a memory 220, a frame buffer 230, and a rendering unit 240. The rendering unit 240 may herein be referred to as "an image renderer," and the two phrases are used interchangeably.

In this exemplary embodiment, the sensing signal SS is processed by the signal controller 400 but is not input to the data driver 200 as first image data DATA1. Instead, the sensing signal SS is directly input to the data driver 200 from the sensing signal processing unit 600, so that the first image data DATA1 and the sensing signal SS may be combined. That is, it is the data driver 200, not the signal controller 400, that combines the first image data DATA1 and the sensing signal SS. By doing this, the sensing signal SS is incorporated into the display image without passing through the image processor (of which the signal controller is a part), so that a touch response time may be shortened. However, processing of the sensing signal SS is not limited to the data driver 200, but may also be performed by the signal controller 400. In this case, the sensing signal SS may be combined with the first image data DATA1 through a configuration which will be described below without passing through the image processor. The controller 210 may receive a rotation signal RS and the sensing signal SS from an external source. The controller 210 may then generate a first storing control signal SCS1, a second storing control signal SCS2, a first read control signal RCS1, and a second read control signal RCS2 based on the rotation signal RS. The first storing control signal SCS1 is a signal which INDicates an at least initial storing order and a storing direction of the memory 220. The second storing control signal SCS2 is a signal which INDicates a change in the storing order and the storing direction of the memory 220 according to the rotation signal RS. Further, the first read control signal RCS1 is a signal which INDicates an initial, or default, reading order and reading direction when the rendering unit 240 reads out data from the memory 220. The second read control signal RCS2 is a signal which INDicates a change in the reading order and the reading direction based on the rotation signal RS when the rendering unit 240 reads out the data from the memory 220.

The controller 210 may select a rotation storing mode and a rotation reading mode. The rotation storing mode and/or the rotation reading mode may be selected by an external mode selection control signal, but the exemplary embodiment is not limited thereto.

In the rotation storing mode, the controller 210 sequentially stores the sensing signal SS in accordance with a changed storing order and a changed storing direction in the memory 220 and according to the second storing control signal SCS2. Thereafter, the controller 210 initiates the reading of the stored sensing signal SS in accordance with the first read control signal RCS1.

In the rotation reading mode, the controller 210 stores the sensing signal SS in the memory 220 according to the first storing control signal SCS1. Thereafter, the controller 210 initiates the reading of the sensing signal SS stored in the memory 220 in the reading order and the reading direction which are INDicated by the second read control signal RCS2.

In the memory 220, the sensing signal SS may be stored in the storing order and the storing direction INDicated by the first control signal SCS1 in the rotation reading mode. In the memory 220, the sensing signal SS may also be stored in the storing order and the storing direction INDicated by the second control signal SCS2 in the rotation storing mode.

The data signals D[1] to D[n] are stored in the frame buffer 230 for every frame.

The rendering unit 240 may read the first image data DATA1 by frame, from the frame buffer 230 in accordance with the reading direction and the reading order which are changed to reflect the rotation direction and the rotation angle of the display panel 100. The rendering unit 240 also reads the sensing signal SS from the memory 220, and combines the first image data DATA1 with the sensing signal SS to generate the second image data DATA2. When the rendering unit 240 receives the first read control signal RCS1, it operates in rotation storing mode, and reads the sensing signal SS in the initial reading order and the reading direction. When the rendering unit 240 instead receives the second read control signal RCS2, it operates in rotation reading mode, and reads the sensing signal SS in the new, or changed, reading order and reading direction.

The data signal generator 250 then generates a plurality of data signals D[1] to D[m] corresponding to the second image data DATA2. The data signal generator 250 may apply the plurality of generated data signals D[1] to D[m] to the corresponding data signal lines D1 to Dm, respectively. Hereinafter, an operation of the data driver in the rotation storing mode will be described with reference to FIGS. 4 to 7. FIGS. 4 to 7 are views explaining an operation of a data driver in a rotation storing mode according to an exemplary embodiment.

Figure 4:
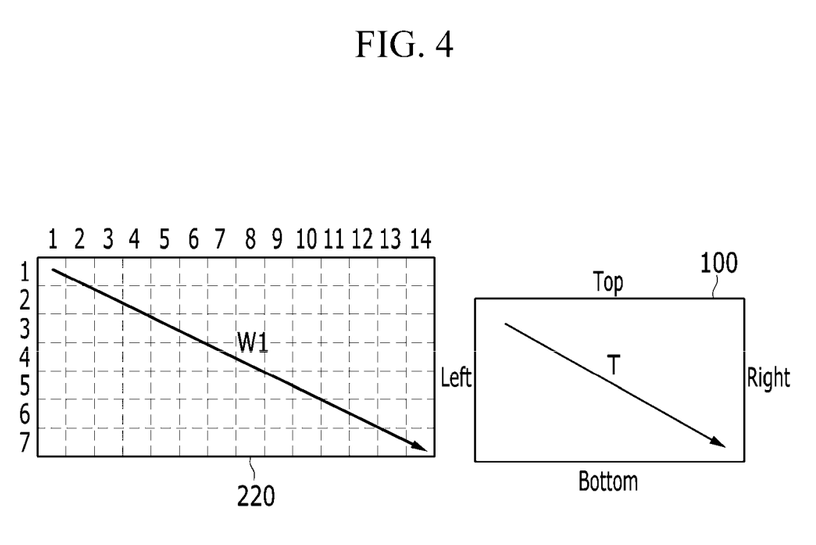
FIGS. 4 to 7 are views explaining an operation of a data driver in a rotation storing mode according to an exemplary embodiment.

FIG. 4 illustrates a case in which display panel 100 does not rotate its image. That is, a rotation angle of a rotation signal RS is 0°. As illustrated in FIG. 4, a memory 220 may be formed with 7 by 14 addresses of (1, 1) to (7, 14) and each address may correspond to a plurality of touch sensors TSU. However, the exemplary embodiment is not limited thereto. The sensing signal SS includes touch information including a touch direction T.

A controller 210 sequentially stores sensing signal SS in a first direction W1 from an address (1, 1) to an address (7, 4) and an address (14, 7) in a memory 220, as directed by the first storing control signal SCS1.

A rendering unit 240 reads the sensing signal SS of the memory 220 in the first direction W1 as directed by the first read control signal RCS1, and combines the first image data DATA1 with the sensing signal SS to generate corresponding second image data DATA2. Combining of these two signals can occur in any suitable manner.

Figure 5:
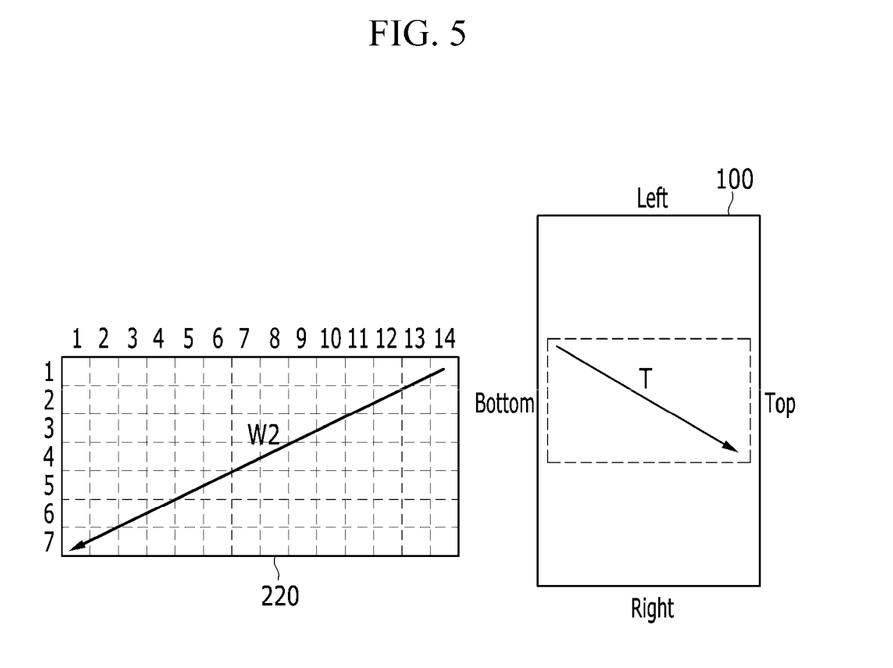

FIG. 5 illustrates a case in which, after the touch information of the touch direction T of FIG. 4 is generated, the display panel 100 rotates its image by 90° in a clockwise direction. That is, the rotation angle of the rotation signal RS is 90°.

The controller 210 sequentially stores the sensing signal SS in a second direction W2 from an address (14, 1) to the address (7, 4) and an address (1, 7) in the memory 220, as directed by the second storing control signal SCS2.

The rendering unit 240 reads the sensing signal SS of the memory 220 in the first direction W1 of FIG. 4 as directed by the first read control signal RCS1 and combines the first image data DATA1 with the sensing signal SS to generate a corresponding second image data DATA2.

Accordingly, as illustrated in a dotted line of FIG. 5, even though the display panel 100 rotates its image by 90° in the clockwise direction, a display image with which the sensing signal SS is combined includes touch information that INDicates the same touch direction T as that in FIG. 4 when the display panel does not rotate its image.

Figure 6:
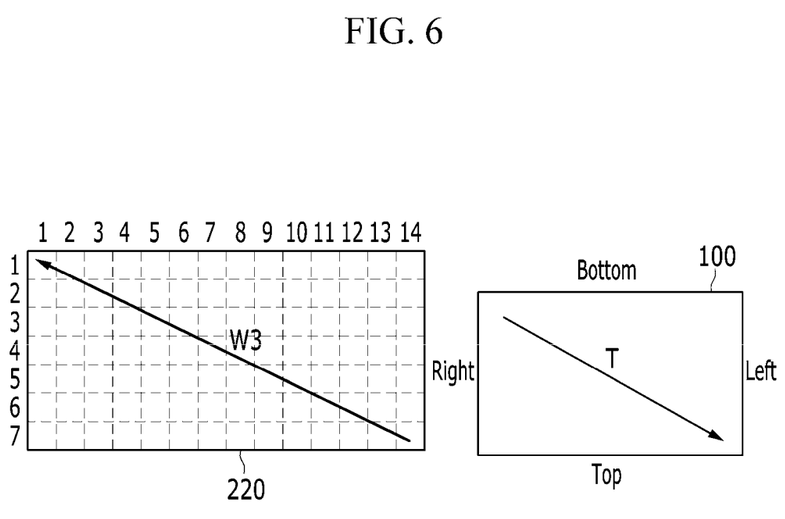

FIG. 6 illustrates a case in which, after the touch information of the touch direction T of FIG. 4 is generated, the display panel 100 rotates its image by 180° in a clockwise direction. That is, the rotation angle of the rotation signal RS is 180°.

The controller 210 sequentially stores the sensing signal SS in a third direction W3 from an address (14, 7) to the address (7, 4) and an address (1, 1) in the memory 220 as directed by the second storing control signal SCS2.

The rendering unit 240 reads the sensing signal SS of the memory 220 in the first direction W1 of FIG. 4 as directed by the first read control signal RCS1 and combines the first image data DATA1 with the sensing signal SS to generate a corresponding second image data DATA2.

Accordingly, as illustrated in FIG. 6, even though the display panel 100 rotates its image by 180° in the clockwise direction, a display image with which the sensing signal SS is combined includes touch information that INDicates the same touch direction T as that in FIG. 4 when the display panel does not rotate its image.

Figure 7:
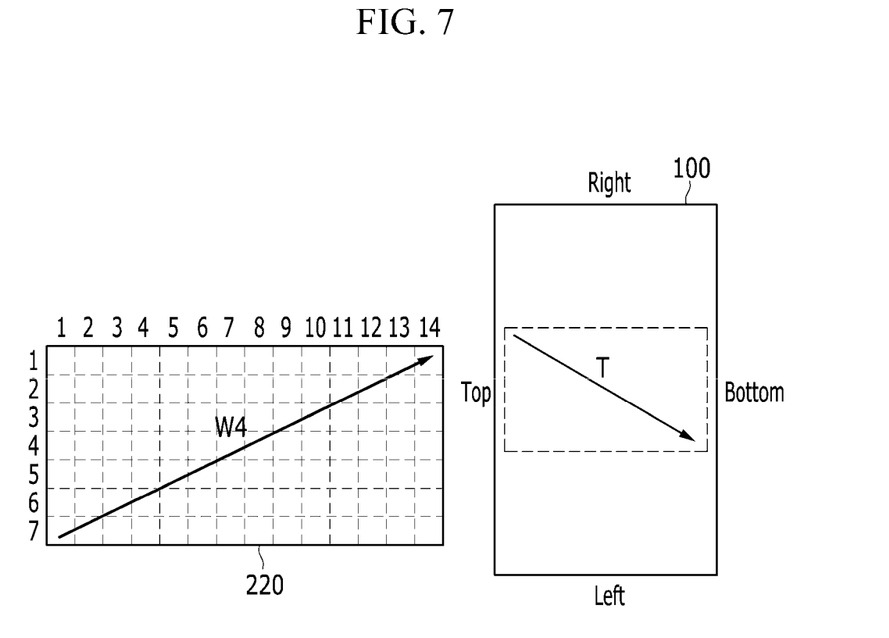

FIG. 7 illustrates a case in which, after the touch information of the touch direction T of FIG. 4 is generated, the display panel 100 rotates at 270° in the clockwise direction. That is, the rotation angle of the rotation signal RS is 270°.

The controller 210 sequentially stores the sensing signal SS in a fourth direction W4 from an address (1, 7) to the address (7, 4) and an address (14, 1) in the memory 220 as directed by the second storing control signal SCS2.

The rendering unit 240 reads the sensing signal SS of the memory 220 in the first direction W1 of FIG. 4 as directed by the first read control signal RCS1 and combines the first image data DATA1 with the sensing signal SS to generate a corresponding second image data DATA2.

Accordingly, as illustrated in a dotted line of FIG. 7, even though the display panel 100 rotates its image by 270° in the clockwise direction, a display image with which the sensing signal SS is combined includes touch information that INDicates the same touch direction T as that in FIG. 4 when the display panel does not rotate its image. Hereinafter, a driving method of a display device according to another exemplary embodiment will be described with reference to FIGS. 4, and 8 to 11. FIGS. 8 to 11 are views explaining an operation of a data driver in a rotation reading mode according to an exemplary embodiment.

Referring to FIG. 4 again, in the rotation reading mode, the controller 210 sequentially stores the sensing signal SS in a first direction W1 from an address (1, 1) to the address (7, 4) and an address (14, 7) in the memory 220 as directed by the first storing control signal SCS1.

Figure 8:
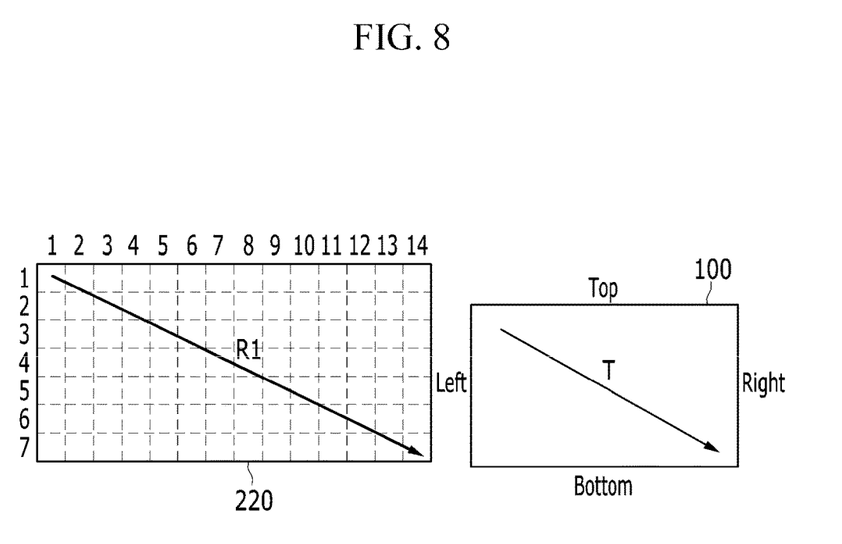
FIGS. 8 to 11 are views explaining an operation of a data driver in a rotation reading mode according to an exemplary embodiment.

FIG. 8 illustrates a case in which the display panel 100 does not rotate its image. That is, a rotation angle of a rotation signal RS is 0°. As illustrated in FIG. 8, the memory 220 may be formed with 7 by 14 addresses of (1, 1) to (7, 14) and each address may correspond to a plurality of touch sensors TSU. However, the exemplary embodiment is not limited thereto. The sensing signal SS includes touch information including a touch direction T as illustrated in FIG. 8.

The rendering unit 240 reads the sensing signal SS of the memory 220 in a fifth direction W5 from the address (1, 1) to the address (7, 4), and the address (14, 7) in accordance with the first read control signal RCS1 and generates first image data DATA1.

Accordingly, as illustrated in FIG. 8, the display image with which the sensing signal SS is combined includes touch information of the touch direction T.

Figure 9:
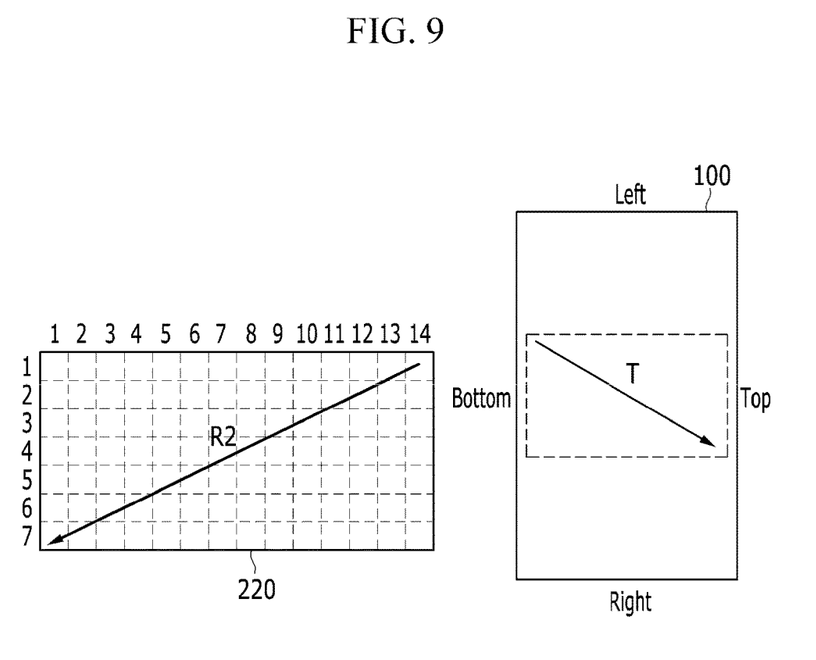

In the case of FIG. 9, after the touch information of the touch direction T of FIG. 8 is generated, the display panel 100 rotates its image by 90° in a clockwise direction. That is, the rotation angle of the rotation signal RS is 90°.

The rendering unit 240 reads the sensing signal SS in a sixth direction W6 from the address (14, 1) to the address (7, 4), and the address (1, 7) in accordance with the second read control signal RCS2 and generates the first image data DATA1.

Accordingly, as illustrated in a dotted line of FIG. 9, even though the display panel 100 rotates its image by 90° in the clockwise direction, a display image with which the sensing signal SS is combined includes touch information that has the same touch direction T as that in FIG. 4 in which the display panel does not rotate.

Figure 10:
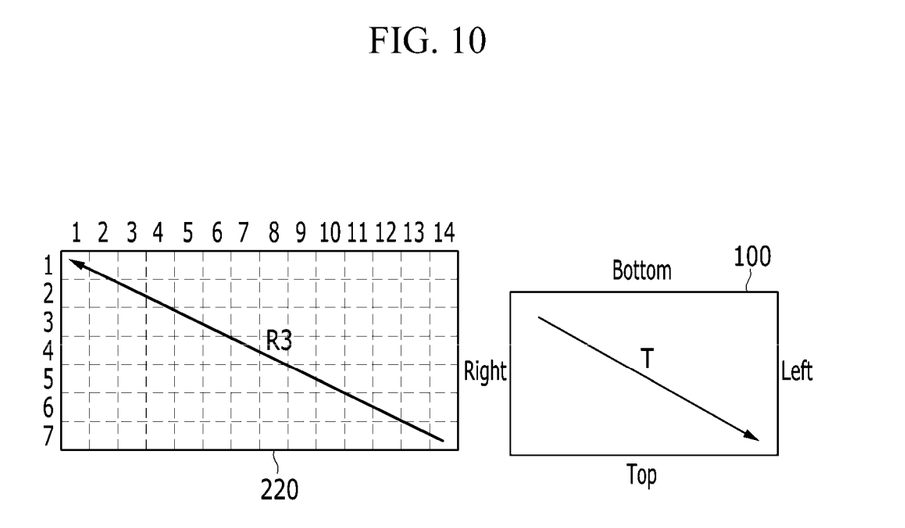

In the case of FIG. 10, after the touch information of the touch direction T of FIG. 8 is generated, the display panel 100 rotates its image by 180° in a clockwise direction. That is, the rotation angle of the rotation signal RS is 180°.

The rendering unit 240 reads the sensing signal SS in a seventh direction W7 from the address (14, 7) to the address (7, 4), and the address (1, 1) in accordance with the second read control signal RCS2 and generates the first image data DATA1.

Accordingly, as illustrated in FIG. 8, even though the display panel 100 rotates its image by 180° in the clockwise direction, a display image with which the sensing signal SS is combined includes touch information that has the same touch direction T as that in FIG. 4 in which the display panel does not rotate.

Figure 11:
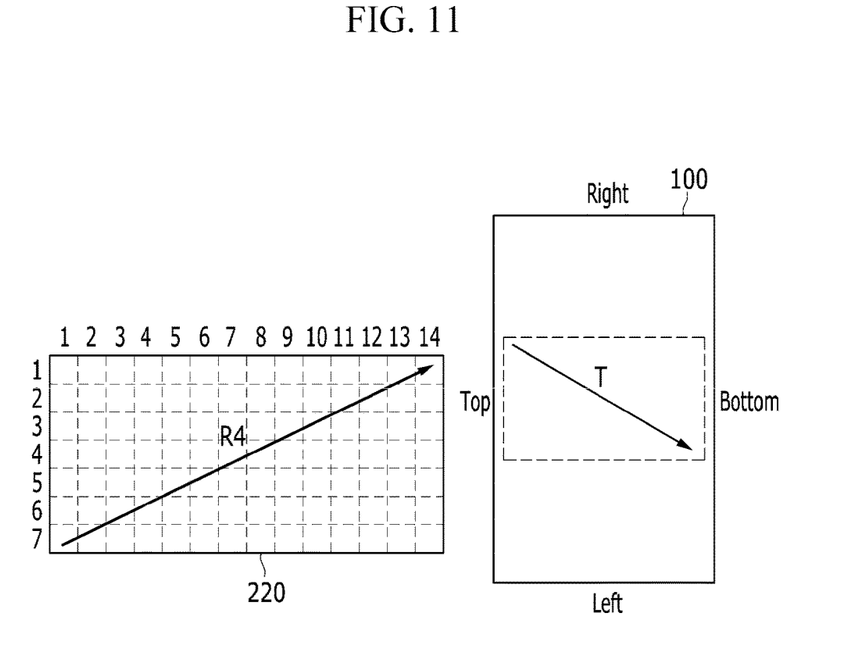

In the case of FIG. 11, after the touch information of the touch direction T of FIG. 4 is generated, the display panel 100 rotates its image by 270° in the clockwise direction. That is, the rotation angle of the rotation signal RS is 180°.

The rendering unit 240 reads the sensing signal SS in an eighth direction (W8) from the address (1, 7) to the address (7, 4), and the address (14, 1) in accordance with the second read control signal RCS2 and generates the second image data DATA2.

Accordingly, as illustrated in a dotted line of FIG. 11, even though the display panel 100 rotates its image by 270° in the clockwise direction, a display image with which the sensing signal SS is combined includes touch information that has the same touch direction T as that in FIG. 4 in which the display panel does not rotate.

For the convenience of description, even though it has been described above that the plurality of memories 220 is formed with a plurality of addresses, that is, 7 by 14 addresses including addresses (1, 1) to (7, 14) and the plurality of touch sensors TSU correspond to the memories, the exemplary embodiments are not limited thereto. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the detailed description should be considered as exemplary, not as limiting. The scope of the present invention should be determined by rational interpretation of the appended claims and all changes are included in the scope of the present invention within the equivalent scope of the present invention. Furthermore, different features of the various embodiments, disclosed or otherwise understood, can be mixed and matched in any manner to produce further embodiments within the scope of the invention.

DESCRIPTION OF SYMBOLS

1: Display device
100: Display panel
200: Data driver
210: Controller
220: Memory
230: Frame buffer
240: Rendering unit
330D: Display scanning driver
300T: Sensing scanning driver
400: Signal controller
500: Touch panel
600: Sensing signal processing unit

What is claimed is:

1. A data driving circuit, comprising:
a controller configured to generate a storing control signal which controls a memory storing direction and a read control signal which controls a memory reading direction, the memory storing direction and the memory reading direction determined according to a rotation signal which includes rotation information of the display device;
a memory in which a sensing signal corresponding to a touch state of one or more touch sensors is configured to be stored in accordance with the storing control signal; and
an image renderer to read the sensing signal according to the memory reading direction of the read control signal and to combine a first image data signal with the sensing signal so as to generate a second image data signal,
wherein:
the storing control signal includes first through fourth storing control signals,
the read control signal includes a first read control signal,
the controller is further configured to direct storage of the sensing signal in the memory in accordance with the first through fourth storing control signals, and
the image renderer is further programmed to read the sensing signal in accordance with the first read control signal.

2. The data driver circuit of claim 1, wherein:
the first through fourth storing control signals comprise data corresponding to 0°, 90°, 180°, and 270°, respectively, and
the first read control signal comprises data corresponding to 0°.

3. The data driving circuit of claim 1, wherein:
the read control signal includes second through fourth read control signals in addition to the first read control signal, and
the image renderer is further programmed to read the sensing signal in accordance with the first through fourth read control signals.

4. The data driving circuit of claim 3, wherein:
the first storing control signal comprises data corresponding to 0°, and
the first through fourth read control signals comprise data corresponding to 0°, 90°, 180°, and 270°, respectively.

5. A display device including a data driving circuit,
wherein the data driving circuit includes:
a controller configured to generate a storing control signal which controls a memory storing direction and a read control signal which controls a memory reading direction, the memory storing direction and the memory reading direction determined according to a rotation signal which includes rotation information of the display device;
a memory in which a sensing signal corresponding to a touch state of one or more touch sensors is configured to be stored in accordance with the storing control signal; and
an image renderer to read the sensing signal according to the memory reading direction of the read control signal so as to generate a data signal corresponding to image data,
wherein:
the storing control signal includes first through fourth storing control signals,
the read control signal includes a first read control signal,
the controller is further configured to direct storage of the sensing signal in the memory in accordance with the first through fourth storing control signals, and
the image renderer is further programmed to read the sensing signal in accordance with the first read control signal.

6. The display device of claim 5, wherein:
the first through fourth storing control signals comprise data corresponding to 0°, 90°, 180°, and 270°, respectively, and
the first read control signal comprises data corresponding to 0°.

7. The display device of claim 5, wherein:
the read control signal includes second through fourth read control signals in addition to the first read control signal,
and,
the image renderer is further programmed to read the sensing signal in accordance with the first through fourth read control signals.

8. The display device of claim 7, wherein:
the first storing control signal comprises data corresponding to 0°, and,
the first through fourth read control signals comprise data corresponding to 0°, 90°, 180°, and 270°, respectively.

* * * * *